Nov. 13, 1934.   R. S. TICE ET AL   1,980,452
FISHING METHOD AND APPARATUS
Filed Jan. 10, 1934   2 Sheets-Sheet 1

INVENTORS
REUBEN S. TICE
MARY H. LITTLEFIELD
BY
ATTORNEYS.

Nov. 13, 1934.  R. S. TICE ET AL  1,980,452

FISHING METHOD AND APPARATUS

Filed Jan. 10, 1934  2 Sheets-Sheet 2

INVENTORS
REUBEN S. TICE
MARY H. LITTLEFIELD
BY Miller Boyken & Bried
ATTORNEYS.

Patented Nov. 13, 1934

1,980,452

UNITED STATES PATENT OFFICE 1,980,452

FISHING METHOD AND APPARATUS

Reuben S. Tice and Mary H. Littlefield, Monterey, Calif.; said Tice assignor to said Littlefield Application January 10, 1934, Serial No. 706,047

17 Claims. (Cl. 43—4)

This invention relates to the seining of fish in a large way and has for its objects a method and apparatus whereby schools of fish may be electrically controlled and concentrated toward the center of a net, such as a purse seine, and prevented from escaping either at the open neck or bottom during the pursing of the seine. Other objects and advantages of the invention will appear from the following description and accompanying drawings.

In the drawings Fig. 1 is a plan view showing a steamer, or "purse seiner" as it may be termed, and its skiff being towed, and about to cut the skiff loose and encircle a school of fish.

It has long been known that fish are stopped from crossing a strong electrified zone maintained in water between spaced points and our invention applies this knowledge in a novel manner to a special and practical use in wholesale fishing operations as conducted in open sea fishing to the end that small schools of fish may be rounded up and concentrated into a large school which is then encircled with a purse seine and during the encircling operations means are used to maintain a strongly electrified zone in the water across the neck or gap of the net, and across the open bottom of the net as the net is being closed, while at the same time the fish are prevented from fouling the ship's propeller by dragging the net into it, and also from bodily forcing the net downward to permit escape of fish over the cork line, by other zones of electrified water.

Figure 1:
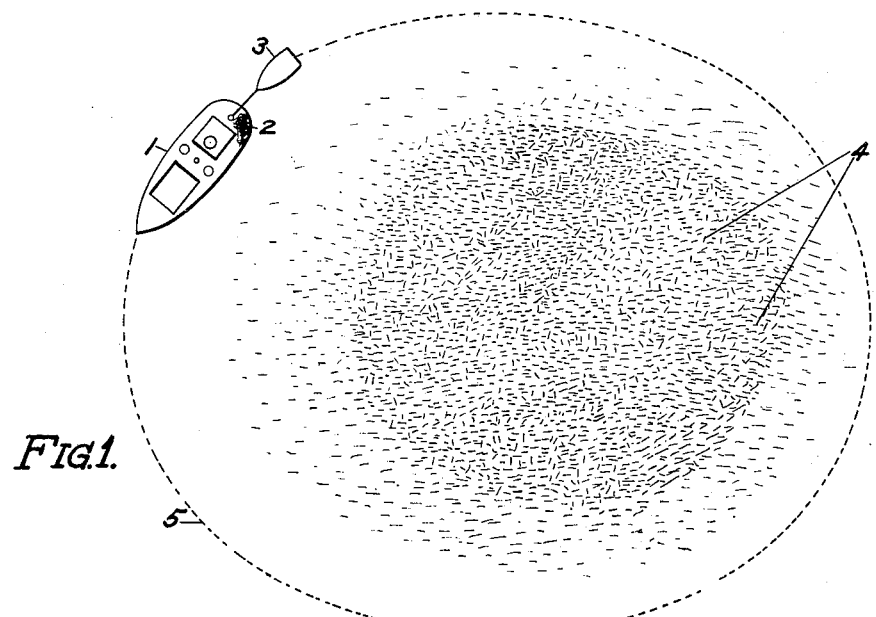

In Fig. 1, 1 is the purse seiner usually a power-driven boat from 50 to 125 feet in length towing a skiff or launch 3, and carrying a seine net 2 properly folded up on deck or on turntable in the well-known manner, not involved in the present invention, all so that the net may easily be payed out into the water when the skiff 2 is cut loose and which, of course, holds the outer ends of the cork and lead lines. Such fishing is done at night and when a school of fish 4 is located, as by phosphorescent glow or otherwise as known in the art, the skiff is at once cut loose and the seiner follows a path as per dotted line 5 to quickly encircle the fish back again to the skiff, and after which the lead line at the bottom of the net is pulled from both ends by winches (not shown) on both boats so as to purse or close the bottom of the net.

Figure 4:
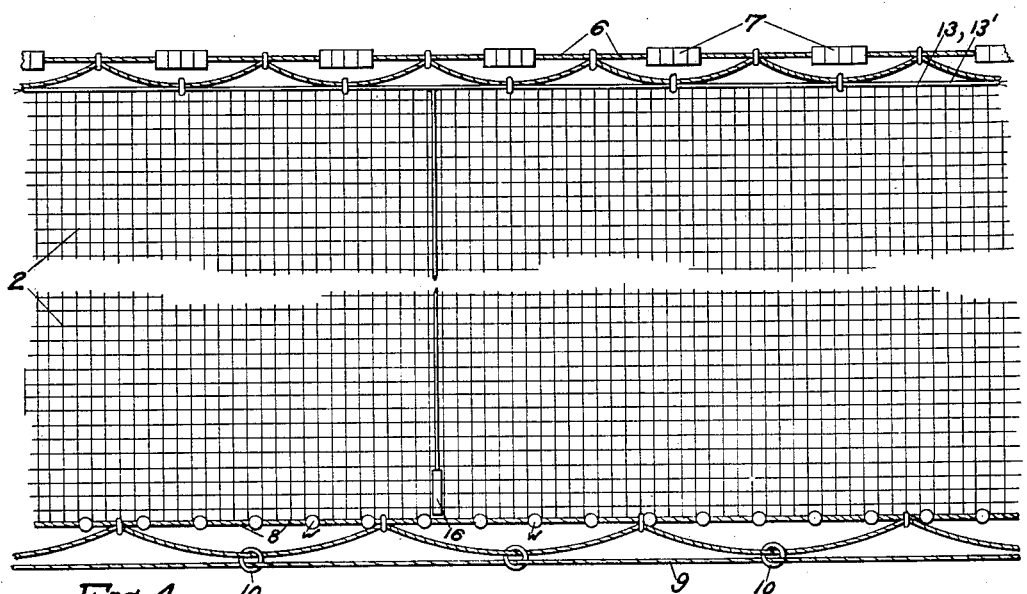
Fig. 4 is an enlarged elevation of a portion of the seine net.

The seine net itself as used in Pacific coast fishing may run from 50 to 200 feet in width and up to 1500 feet long or more, and may be of the usual construction as indicated in Fig. 4 wherein a cork line 6 carrying floats 7 supports the upper edge and weights along the lead line 8 hold the lower edge down, and a purse line 9 is provided at the lower edge and slidably supported in rings 10 for pursing the net by pulling from either or both ends, all of the above description being as well understood in the art and involving no invention in the present case but forming the net structure to which the electric control of the present invention is applied.

The purse seiner carries one or more powerful electric generators 11 preferably alternating and capable of producing a voltage of from 250 to 3000 and generally from 10 to 50 amperes, depending on the distance to be covered, and a suitable controlling and distributing panel 12 for the several circuits required. One side of the circuits is grounded to the ship's hull, if of metal, or to a submerged electrode carried thereby, while the live legs of the circuits are carried through insulated wires to various points, two through a pair of flexible insulated wires 13 and 13' along the upper edge of the net and two branches 14, 15 of one of the wires extend downwardly on the net at points which would be on the opposite side of the enclosed net from the ship and are fitted at their lower ends with short naked electrodes 16, 17, while the other wire, 13', extends the length of the net and is connected at both ends of the net with vertically disposed electrodes 18 and 19, or wires entirely bare for the depth of the net, or with bare spots at intervals, or it is better to have electrode 18 only in the circuit and run a third feed wire 13" from the ship to vertical electrode 19 so that the current from 18 may be varied without affecting the current from 19.

To carry out the invention it is also desirable to provide an electrode 21 which may be lowered as from a crane 22 on the off side of the ship for a purpose to be hereinafter described.

Figure 3:
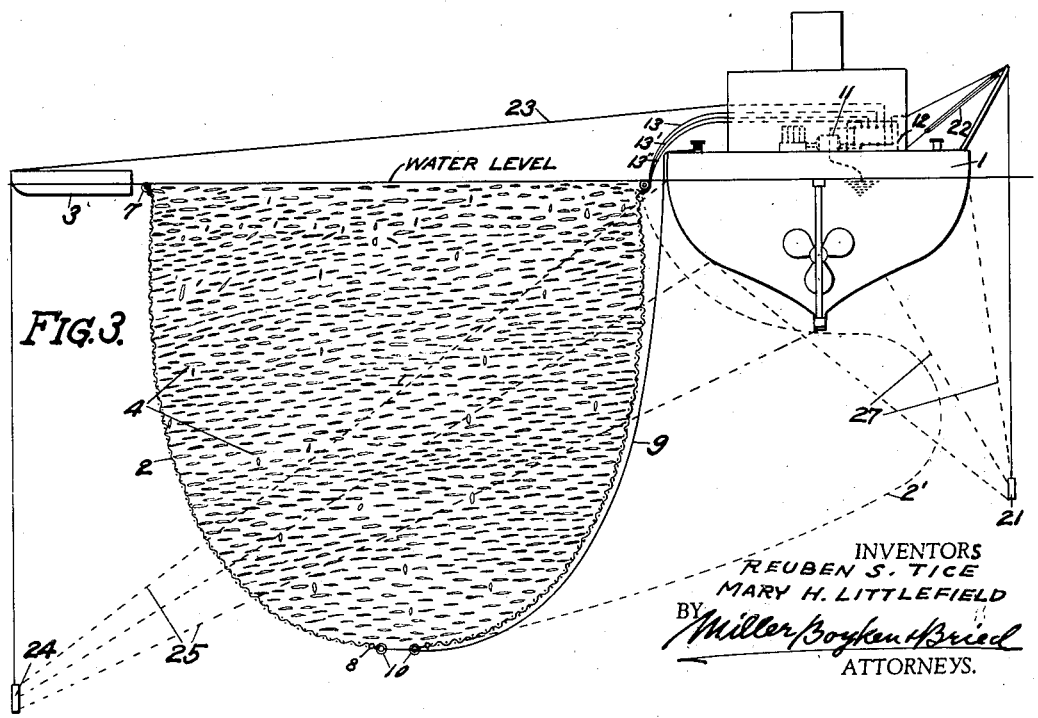
Fig. 3 is an enlarged vertical view or section of the net closed at the bottom around the fish, the purse seiner alongside and with the skiff at the opposite side of the net with lowered electrode.

In addition to the above circuits it is desirable to pass an extra insulated circuit wire 23 from the switchboard to the skiff immediately after enclosing the fish in the net, and whereupon the skiff may leave the closed ends of the net in charge of the ship and proceed to a point at the outside of the net opposite the ship as indicated in Fig. 3 at 3' with an electrode 24 connected to the wire and suspended into the water at a point near the bottom of the net so that the electric current to be used will follow the dotted paths 25 of Fig. 3 back to the ship's hull and will pass through the lower fish region in the net to drive them upwards.

Figure 5:
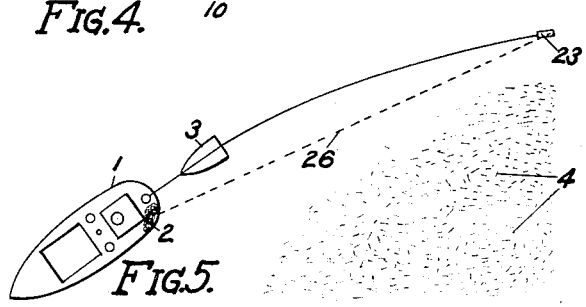
Fig. 5 is a plan showing the purse seiner and skiff towing an electrode for rounding up the fish into a concentrated school.
Figure 2:
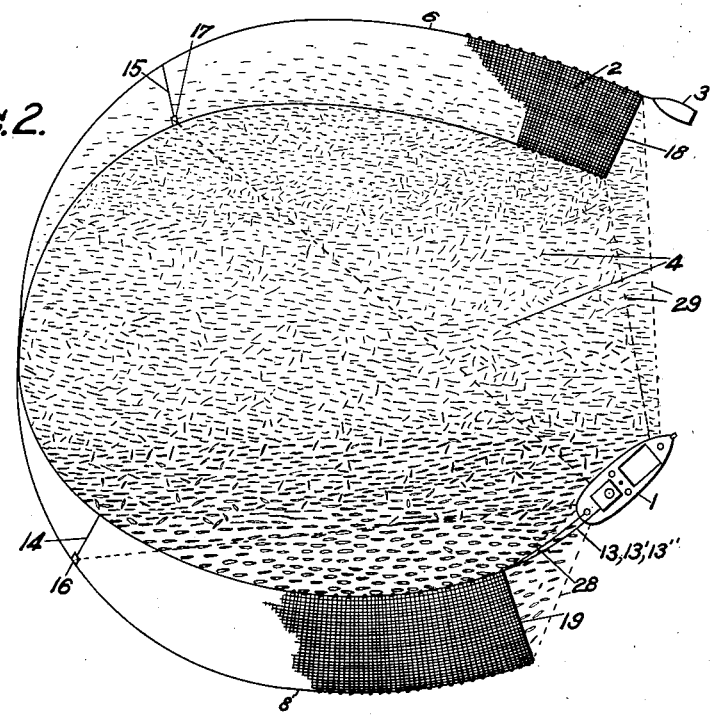
Fig. 2 is a similar view somewhat in perspective but showing the net dropped and the school of fish almost encircled.

Another use of this suspended electrode 24 from the skiff is during the towing of the skiff by the ship as shown in Fig. 5. The electrode will trail rearwards and a current may be caused to flow from the trailing electrode back to the ship's hull along the path 26, so that by thus steaming around several small schools of fish and gradually closing in on them this electrified zone will drive all the fish toward the center of the encircling action so that as soon as the fish of several small schools are sufficiently concentrated in the central area into one large school, the skiff can be cut loose and the net dropped.

As soon as the net is entirely paid out the switch board operator closes the circuits through electrodes 19 and 18 to electrify the water as a vertical wall from those electrodes to the ship as indicated by dotted lines 28, 29, and thus prevent escape while the net is being closed, also the circuit to electrodes 16 and 17 is closed so as to throw a current through the water strata near the bottom of the open net to the ship and thus drive the fish upward while the lower lead line is being drawn to purse the net.

When the fish are enclosed they sometimes dive downward and, if in sufficient numbers, may pull the cork line under so that many escape overhead. To avoid this the skiff is at once run around to the point 3' as in Fig. 3 and a current sent from its submerged electrode 24 back to the ship so as to pass through the lower portions of the net. This seems to stun the fish, or at least scare them upward, so that they cease to put their weight or force upon the net. Or the current may be kept at or below the bottom of the net to scare the fish upward by cutting out the ship's hull as a ground and making electrode 21 the ground.

It is also common in purse seining to have the fish move in a body toward the ship and drag the net over to the position 2' and foul the propeller with great injury to the net as well as with loss of the catch. To overcome this, a circuit from electrode 21 is brought into action, and which in spreading out as at 27 to the hull of the ship forms a barrier into which the fish will not penetrate.

As the gap in the open net is gradually closed through advance of the ship toward the skiff, the current may be reduced to a point sufficient to keep the fish in check, and when about closed the current is cut out, and the two ends of the net brought together by the crew and the net drawn together in the known way, the bottom being closed by the purse line in the meantime, and after which all circuits except the one from electrode 21 and possibly electrode 24 are discontinued. The purse line and bunched lead line are hauled up on deck by power winches, not shown, and the slack is taken up in the cork line in the usual manner preparatory to bailing out the fish.

Having thus described our improved method and means for controlling of fish in purse seining, it will be apparent that changes in details may be made by those skilled in the art within the scope of our appended claims.

We therefore claim:

1. The method of fishing which comprises creating an electrified zone in the water and moving said zone around the area containing the fish so as to concentrate them into a school, then surrounding the concentrated fish with a purse seine.

2. The method of fishing which comprises creating an electrified zone in the water and moving said zone around the area containing the fish so as to concentrate them into a school, then surrounding the concentrated fish with a purse seine while projecting an area of electrification in the water across the open neck of the net during the closing of the same.

3. The method of fishing which comprises creating an electrified zone in the water and moving said zone around the area containing the fish so as to concentrate them into a school, then surrounding the concentrated fish with a purse seine while projecting an area of electrification in the water across the open neck and bottom of the net during the closing of the same.

4. The method of fishing which comprises surrounding a school of fish with a purse seine and maintaining an electrified area in the water across the open neck of the net during the closing of the same.

5. The method of fishing which comprises surrounding a school of fish with a purse seine and maintaining an electrified area in the water across the open neck and bottom of the net during the closing of the same.

6. The method of fishing which comprises surrounding a school of fish with a purse seine and maintaining an electrified area in the water across the open bottom of the net during the closing of the same.

7. The method of fishing which comprises surrounding a school of fish with a purse seine while maintaining a substantially vertical wall-like area of electrified water between the ends of the net during closing of the same, the electrification being sufficient to prevent escape of fish through said area.

8. In the operation of fishing with a purse seine laid by a purse seiner around a school of fish, the steps which comprise generating electrical energy on the purse seiner grounded to the metal hull of the boat, and creating one or more zones of electrified areas in the water from points in the water to control the fish carried out through means of submerged electrodes energized from insulated lines run from the boat to said points.

9. In the operation of fishing with a purse seine laid by a purse seiner around a school of fish, the steps which comprise generating electrical energy on the purse seiner and causing said electrical energy to traverse that area in the water which lies between the final end of the net and the boat.

10. In the operation of fishing with a purse seine laid by a purse seiner around a school of fish, the steps which comprise generating electrical energy on the purse seiner and causing said electrical energy to traverse those areas in the water which lie between the final end of the net and the boat and between the first end of the net laid and the boat.

11. In the operation of fishing with a purse seine laid by a purse seiner around a school of fish, the steps which comprise generating electrical energy on the purse seiner and sending said energy from a submerged electrode upward toward the boat in a manner to drive the fish in direction of the net and away from the stern of the boat.

12. In the operation of fishing with a purse seine laid by a purse seiner around a school of fish, the steps which comprise generating electrical energy on the purse seiner and sending said energy from a submerged electrode through the mass of fish in the net to the boat.

13. A purse seine of the character described provided with an insulated electric wire extending along the net, and an electrode carried by said net electrically connected to said wire.

14. A purse seine of the character described provided with an insulated electric wire extending along the net, and a plurality of electrodes carried by said net electrically connected to said wire.

15. A purse seine of the character described provided with an insulated electric wire extending along the net, and a plurality of electrodes carried by said net electrically connected to said wire, two of said electrodes being positioned adjacent the lower edge of the seine and spaced intermediate the ends of the net.

16. A purse seine of the character described provided with an insulated electric wire extending along the net, and a plurality of electrodes carried by said net electrically connected to said wire, two of said electrodes being positioned adjacent the opposite ends of the net.

17. In the operation of fishing with a purse seine laid by a purse seiner around a school of fish, the steps which comprise generating electrical energy on the purse seiner and sending said energy from spaced submerged electrodes through the water under the mass of fish in the net to scare the fish toward the surface.

REUBEN S. TICE.
MARY H. LITTLEFIELD.